UNITED STATES PATENT OFFICE.

OTTO E. RUHOFF, OF MADISON, WISCONSIN, ASSIGNOR TO FRENCH BATTERY & CARBON COMPANY, OF MADISON, WISCONSIN, A CORPORATION OF WISCONSIN.

OIL-PROTECTED ELECTRIC BATTERY AND METHOD OF PRODUCING THE SAME.

1,352,834.    Specification of Letters Patent.    Patented Sept. 14, 1920.

No Drawing.    Application filed April 28, 1919.   Serial No. 293,049.

*To all whom it may concern:*

Be it known that I, OTTO E. RUHOFF, a citizen of the United States, residing at Madison, in the county of Dane and State of Wisconsin, have invented a certain new and useful Improvement in Oil-Protected Electric Batteries and Methods of Producing the Same, of which the following is a specification.

This invention relates to dry batteries of the type used in operating ignition, and telephone equipment and flash lamps.

It is well understood in the art that when the ordinary electric battery of this type is made up and is put on a shelf for storage or as it is commonly called "subjected to shelf wear," there is set up, ultimately between mineral and other impurities in the manganese depolarizer or other materials of the battery, and the zinc can or electrode, a chemical action which is in time very destructive of the zinc. The object of this invention is to provide, in an electric battery of this type, a protecting coating for the interior of the zinc can which will protect it from this chemical action arising between it and the impurities of the battery but which will not, when the battery is put in actual use, interfere with the normal operation of the battery. Broadly stated, the invention consists in oiling the zinc before assembling it with the ordinary battery materials and in an improved method of applying an oil film to the zinc container. More particularly the invention consists in the features and details of construction hereafter more fully set forth in the specification and claims.

It is well understood in the art that a dry battery of the class described comprises an exterior zinc can forming one electrode, an interior carbon pencil, surrounded by depolarizing material, forming the second electrode of the battery, and an intervening supply of either gelatinous electrolyte or a lining of bibulous paper soaked in electrolyte, through which electrolytic action takes place between the carbon and zinc poles of the battery. Batteries of this type are so well known in the art that it is unnecessary to show the construction by drawing, particularly as this invention has nothing to do with the mechanical details of the arrangement of the battery.

In carrying out this invention, the interior of the zinc can is coated with oil by any suitable method before the rest of the battery is assembled in it. The most satisfactory method of applying the oil to the interior of the can is to place in the can some gasolene containing about 5% of oil, let it stand a few minutes and then pour out the solution. The result of this operation leaves a sufficient film of oil on the wall of the can. The oil may, however, be applied in its normal form by a brush or swab, or otherwise without departing from this invention.

Among the oils already tested and found satisfactory for this purpose are:—neat's-foot, machine oils Nos. 1, 2, 3 and 4, peanut oil, linseed oil Nos. 1 and 2, cottonseed oil, fish oil, paraffin oil, olive oil, sperm oil, sesame oil.

When the can has been coated with oil as described, the remaining normal battery materials are assembled in it in the ordinary manner; and the battery is completed, ready for sale.

Actual test has demonstrated that a battery treated in this way has a very remarkable shelf wear wholly unknown in the case of batteries now used, this without destroying the operating efficiency of the battery.

It may be noted that commercial sheet zinc normally carries a small amount of grease which it acquires in the process of manufacture but this is wholly insufficient to secure the result desired which is produced by the use of this invention.

It is not claimed for this oil that it will protect the zinc from excessive quantities of nor from excessively corrosive materials but it will do its work under all ordinary conditions of modern commercial practice.

The method of applying the oil film to the interior of the can described above is advantageous for the reason that by the simple expedient explained, the oil is evenly applied in an attenuated film to the interior surface of the zinc can. Moreover, the gasolene which serves as a means for applying the very thin film of oil serves also to cleanse the interior surface of the zinc from impurities, and applies the thin film of oil evenly to the cleansed surface. This results in properly protecting the can when the circuit is open, while at the same time the film is sufficiently attenuated and evenly distributed to permit efficient operation when the circuit is closed.

Gasolene acts as a solvent for the oil, apparently placing it in exceedingly fine subdivision throughout the gasolene; and inasmuch as a 5% solution is sufficient to give the desired result, it is evident that when a zinc can is filled with the solution and the solution is then poured out, there remains only a very small amount of the oil carried by the small amount of gasolene which wets the interior of the can. The gasolene evaporates almost instantly, leaving a very attenuated film of oil on the interior surface of the can. Thus, a very few drops of oil (probably about three drops) will suffice to give the desired protective coating to a can of ordinary size, and the amount used is so small that it will not interfere with the normal operation of the battery. Good results cannot be obtained by using a fluid which will merely carry ordinary sized drops in suspension. On the other hand, any suitable volatile solvent, such as benzol, acetone, carbon tetrachlorid, turpentine, or other volatile thinning liquid, with which the oil is miscible or which will disperse the oil and produce a thin emulsion, or colloidal solution, may be employed as a vehicle for applying the oil film to the zinc.

Having thus described my invention, what I claim as new and desire to secure by Letters Patent, is:—

1. In a battery, in combination with the usual carbon, depolarizing materials, zinc and electrolyte, an attenuated protecting coating of oil on the zinc protecting the zinc from chemical action when the battery is at rest, but which does not interfere with efficient action of the battery when in use.

2. The method of applying a protecting film of oil to the zinc element of an electric battery, which consists in bringing into contact with the operative surface of the zinc a dilute solution of the oil, and thus providing the zinc with an attenuated film of oil.

3. The method of applying a protecting film of oil to the zinc element of an electric battery, which consists in bringing into contact with the operative surface of the zinc a mixture of gasolene containing a small percentage of the protecting oil, and thus providing the zinc with an attenuated film of oil.

In witness whereof, I have hereunto subscribed my name in the presence of two witnesses.

OTTO E. RUHOFF.

Witnesses:
DWIGHT B. CHEEVER,
ANNA ROSENTHAL.